No. 862,555. PATENTED AUG. 6, 1907.
E. M. GOVER.
TREADLE OPERATED DELIVERY WAGON.
APPLICATION FILED MAR. 4, 1907.

WITNESSES:
INVENTOR
Edwin M. Gover
By Wm. H. Bates

Attorney

UNITED STATES PATENT OFFICE.

EDWIN M. GOVER, OF WASHINGTON, DISTRICT OF COLUMBIA.

TREADLE-OPERATED DELIVERY-WAGON.

No. 862,555.      Specification of Letters Patent.      Patented Aug. 6, 1907.

Application filed March 4, 1907. Serial No. 360,503.

*To all whom it may concern:*

Be it known that I, EDWIN M. GOVER, a citizen of the United States, residing at Washington, in the District of Columbia, have invented certain new and useful Improvements in Treadle - Operated Delivery-Wagons, of which the following is a specification.

My invention relates to improvements in treadle operated and hand steering delivery wagons, and the objects are to simplify and improve the existing art by providing a wagon that can be easily and conveniently operated for the purposes intended and which can also be accessible to places where the ordinary wagon fails to accomplish the purposes above stated.

I accomplish these objects by the particular construction of said wagon.

The invention, therefore, resides in the novel construction of parts and their aggroupment as will be hereinafter fully described and then the asserted novelty will be particularly pointed out and distinctly claimed.

Figure 1:
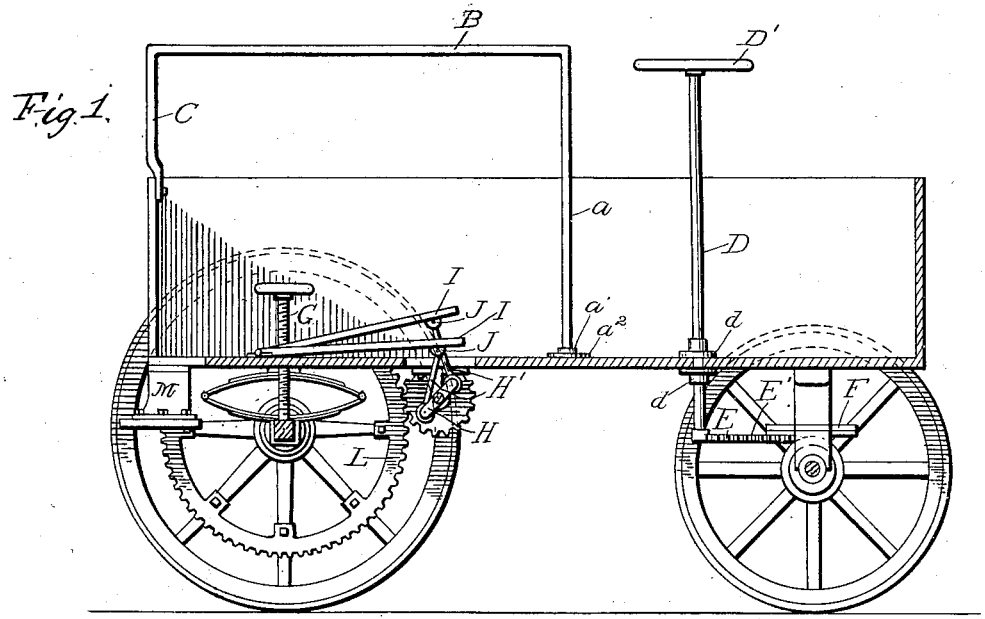
Figure 2:
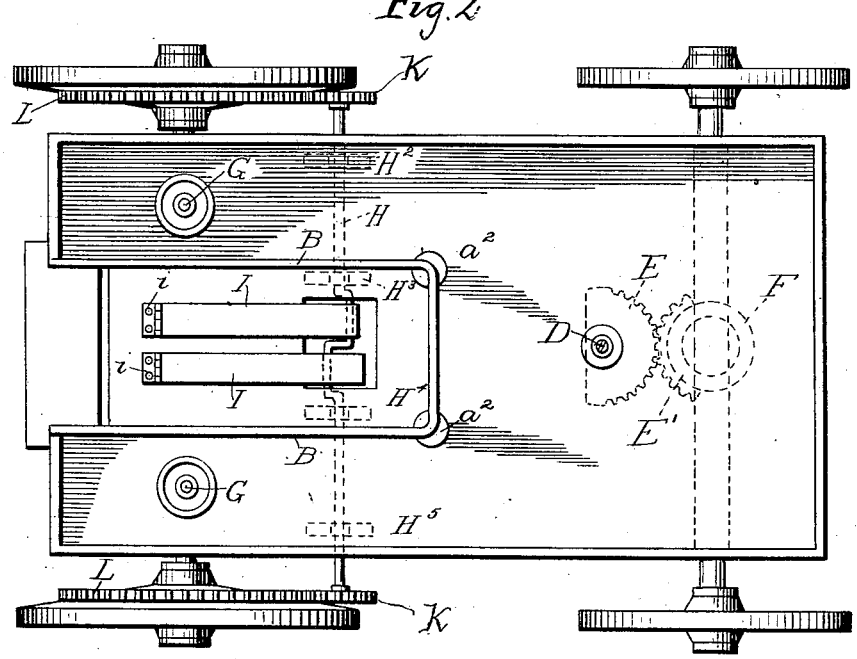

I have fully and clearly illustrated the improvements in the annexed drawings to be taken as a part of this specification, and wherein: Figure 1 is a longitudinal vertical central sectional view of my improved wagon, and Fig. 2 is a top or plan view of the same.

Referring particularly to the drawings by reference notations, A designates a wagon body mounted upon the forward and rear axles of the driving wheels and supported thereon by interposed springs and bolster in the usual manner; these features forming no part of my invention, a particular description thereof is not herein deemed necessary.

The rear end of the bed or body of the wagon is provided with a metallic guard or railing composed of vertical uprights $a\ a$ having their lower ends socketed in sockets $a'$ formed in circular plates $a^2\ a^2$ secured centrally to the bottom or bed and from the top of these uprights and extending horizontally and rearwardly are the rail portions B B B terminating in short depending portions C, having their lower ends secured to the rear end of the wagon body.

The object of the rails previously described is to allow the operator to conveniently grasp said rails while operating the treadles with his feet and by the upward pull upon the rails with his hands he gets this additional hand operated advantage therefrom which would increase the downward thrust upon the treadles and increase the power of the wagon.

D, is a shaft having the hand wheel D', the shaft being passed revolubly through the small tubular plates $d, d$ secured to the bed. Connection is made with the fifth-wheel F by the sectors E and E'.

G G designate hand wheel screws which are located in the rear of the wagon and in alinement with each other and are passed through the bed or bottom of the openings in the bed having screw threaded metallic plates secured to the under side of the bed of the wagon, said plates having open ended screw threaded tubes projected upwardly the width of the bed with which the screw threads of the hand wheel shafts take, the tubes not being shown in the drawings, permitting the screws to pass through the same, the lower ends of the shafts abut against the rear axle and remain in contact with it.

H H designate a crank shaft supported from the under side of the bed or body of the wagon by means of one or more hangers or supports $H'\ H^2\ H^3\ H^4\ H^5$ secured to said bed or body, the crank shaft being passed through said supports or hangers.

I I designate foot treadles arranged parallel with each other and hinged at their rear ends to the inner side of the bed or body, as at $i\ i$, the forward ends of the treadles having eyes J J secured to the under side thereof, through which is also passed the crank shaft H, a rectangular opening being formed in the bed or body to allow of play given to the cranks of the crank shaft by means of pinions K K secured to the ends of said crank shaft which mesh with cog wheels L L rigidly secured to the inner faces of the driving wheels.

A step M is rigidly secured to the under side and rear of the bed of the wagon for ingress and egress to said wagon, as more clearly shown in Fig. 1 of the drawings.

It will be seen from the above description that I have equipped a wagon with my invention which is simple both in its construction and operation, and one which can be easily operated and adjusted by any inexperienced person and which is best adapted to perform the objects in view, and I do not wish to limit myself to the construction and assemblage of parts, as they may be modified and still the main objects of the invention be attained.

Having thus described my invention, what I claim as new and desire to secure by Letters Patent is:

In a wagon of the character described, the driving wheels having the cogged gearing secured directly thereto, the crank-shaft provided with pinions upon their extreme outer ends meshing with the cogged gearing, the said crank-shaft being supported in bearings upon the underside of the wagon, the bed having a rectangular opening therein, treadles hinged to the bed of the wagon at their rear ends, the forward ends having eyes secured thereto through which the crank-shaft is passed, cranks formed on the crank-shaft and projected through the rectangular opening in the bed operatively connecting the crank-shaft and pedals, the uprights $a$ and rectangular disposed rails located in the rear of the wagon and at each side of the treadles conveniently to the operator, all arranged and operated as shown and described.

In testimony whereof I affix my signature, in presence of two witnesses.

EDWIN M. GOVER.

Witnesses:
     J. M. MOORE,
     E. E. JOHANSEN.